United States Patent [19]
Cerisano

[11] Patent Number: 4,606,879
[45] Date of Patent: Aug. 19, 1986

[54] HIGH STALK BLOWN FILM EXTRUSION APPARATUS AND METHOD

[76] Inventor: Frank D. Cerisano, 23 Copley Ct., North Haledon, N.J. 07508

[21] Appl. No.: 706,517

[22] Filed: Feb. 28, 1985

[51] Int. Cl.⁴ ............................................. B29C 47/88
[52] U.S. Cl. ................................... 264/565; 264/566; 264/569; 425/72 R; 425/326.1
[58] Field of Search ............... 264/566, 564, 565, 569, 264/563, 40.3, 40.6; 425/72 R, 326.1, 140

[56] References Cited

U.S. PATENT DOCUMENTS

| | | | |
|---|---|---|---|
| 3,088,167 | 5/1963 | Corbett | 425/326.1 |
| 3,170,011 | 2/1965 | Cheney et al. | 264/569 |
| 3,243,486 | 3/1966 | Pilaro | 425/326.1 |
| 3,307,218 | 3/1967 | Reifenhauser | 425/72 |
| 3,329,999 | 7/1967 | Cook | 264/565 |
| 3,412,189 | 11/1968 | Sullivan | 264/565 |
| 3,445,891 | 5/1969 | Thordarson | 425/72 |
| 3,618,169 | 11/1971 | Coast | 264/565 |
| 3,714,309 | 1/1973 | Biglano | 264/89 |
| 3,888,609 | 6/1975 | Saint Eve et al. | 425/326.1 |
| 3,976,411 | 8/1976 | Rahlfs et al. | 425/72 |
| 4,049,768 | 9/1977 | Luthra | 264/455 |
| 4,105,380 | 8/1978 | Zimmerman | 425/72 |
| 4,115,048 | 9/1978 | Alderfer | 425/72 |
| 4,123,487 | 10/1978 | Saito | 264/90 |
| 4,140,460 | 2/1979 | Carlsen | 425/140 |
| 4,165,356 | 8/1979 | Heider | 264/519 |
| 4,174,932 | 11/1979 | Herrington | 425/72 R |
| 4,189,288 | 2/1980 | Halter | 425/72 R |
| 4,192,637 | 3/1980 | Chong | 425/140 |
| 4,204,819 | 3/1980 | Ushioda et al. | 264/565 |
| 4,251,199 | 2/1981 | Imaizumi et al. | 425/326.1 |
| 4,330,501 | 5/1982 | Jones et al. | 425/326.1 |
| 4,399,094 | 8/1983 | Fujitani et al. | 264/566 |
| 4,447,387 | 5/1984 | Blakeslee et al. | 425/326.1 |
| 4,472,343 | 9/1984 | Kawamura et al. | 425/326.1 |
| 4,473,527 | 9/1984 | Fujisaki et al. | 264/569 |
| 4,479,766 | 10/1984 | Planeta | 425/72 R |

FOREIGN PATENT DOCUMENTS

| | | | |
|---|---|---|---|
| EP21420 | 1/1981 | European Pat. Off. | 425/326.1 |
| 78738 | 5/1983 | European Pat. Off. | |
| 57-45031 | 3/1982 | Japan | 264/510 |
| 58-212918 | 12/1983 | Japan | 264/209.5 |
| 59-71825 | 4/1984 | Japan | 264/565 |
| 59-136224 | 8/1984 | Japan | 264/569 |
| 59-171620 | 9/1984 | Japan | 264/569 |

*Primary Examiner*—Jeffery Thurlow
*Attorney, Agent, or Firm*—Lerner, David, Littenberg, Krumholz & Mentlik

[57] ABSTRACT

A high stalk blown film extrusion apparatus and method is described which produces a stabilized high stalk for increasing the production rate of blown, low to high molecular weight polymers, while increasing the film's physical and mechanical properties. The high stalk is stabilized by application of high velocity, low volume flow rate of air over the interior and exterior surfaces of the extruded film.

47 Claims, 1 Drawing Figure

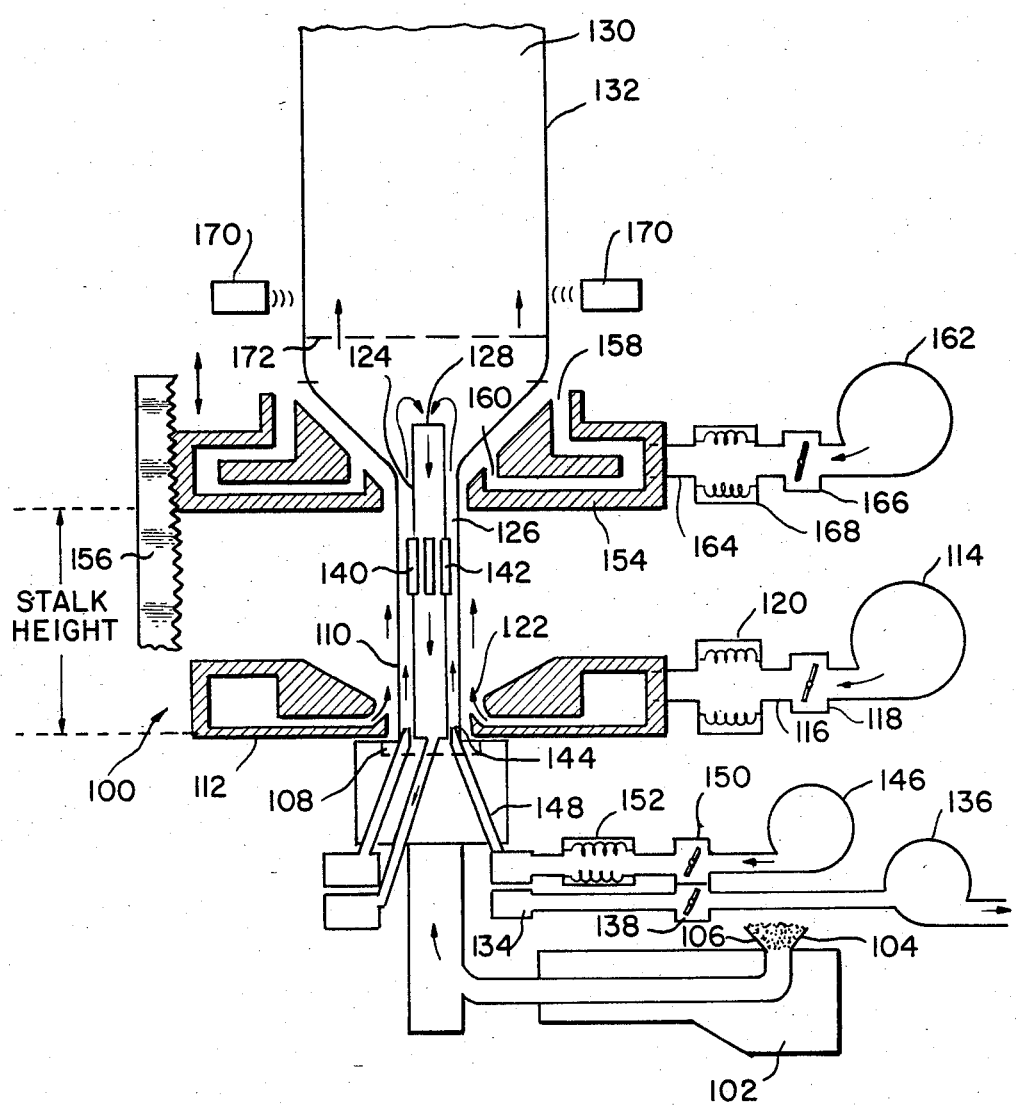

HIGH STALK BLOWN FILM EXTRUSION APPARATUS AND METHOD

BACKGROUND OF THE INVENTION

The present invention relates in general to a blown film extrusion apparatus and method, and more particularly, to such an apparatus and method which produces a stabilized, high stalk between spaced-apart tendem air rings for increasing the production rate of blown, low to high molecular weight polymers, while improving the film's physical and mechanical properties.

The use of spaced-apart tandem air rings has been reported to improve the production rate as well as the physical and mechanical properties of blown plastic film. These improvements are attributed in part to the creation of a high stalk of a semi-molten state which allows the viscoelastic forces of the extruded film to dissipate before expansion. This artificially created condition produces improved drawdown characteristics and allows the molecular re-orientation of the film to provide increased impact strength. However, although an improvement over conventional blown film, the tandem air ring arrangement results in limited film width and production rate capabilities due to instability of the high stalk, i.e., oscillation of the film about its longitudinal axis whereby undesirable wrinkles form in the finally collapsed film. In addition to the formation of wrinkles, severe instability of the high stalk at increased production rates can result in tearing of the blown film which cause its ultimate collapse during the extrusion processes.

SUMMARY OF THE INVENTION

It is broadly an object of the present invention to provide a high stalk blown film extrusion apparatus and method which overcomes or avoids one or more of the foregoing disadvantages resulting from the use of the above-mentioned prior art tandem air ring arrangement and which fulfills the requirements of such a high stalk extrusion apparatus and method for manufacturing blown film from polymers of low to high molecular weight. Specifically, it is within the contemplation of one aspect of the present invention to provide a high stalk blown film extrusion apparatus and method which provides increased stability of the high stalk between spaced-apart tandem air rings to permit an increase in the production rate, while improving the film's physical and mechanical properties over such film manufactured using either tandem or conventional air ring arrangements.

Another object of the present invention is to provide a high stalk blown film extrusion apparatus and method which produces a plastic film having improved gauge uniformity.

Another object of the present invention is to provide a high stalk blown film extrusion apparatus and method which produces a plastic film having reduced gauge standard deviation.

Another object of the present invention is to provide a high stalk blown film extrusion apparatus and method for producing a plastic film having improved optical properties.

Another object of the present invention is to provide a high stalk blown film extrusion apparatus and method for producing a plastic film having improved impact strength.

Another object of the present invention is to provide a high stalk blown film extrusion apparatus and method for producing a plastic film having improved down gauging capability.

Another object of the present invention is to provide a high stalk blown film extrusion apparatus and method for producing plastic films from low to high molecular weight polymers.

Another object of the present invention is to provide a high stalk blown film extrusion apparatus and method for producing plastic film having increased blow-up ratios, i.e., the ratio of extrusion die diameter to blown film diameter.

Another object of the present invention is to provide a high stalk blown film extrusion apparatus and method for producing plastic film having an increased range of widths.

In accordance with one embodiment of the present invention, there is provided an apparatus for forming a film of plastic material. The apparatus is constructed of means for forming a progressively advancing tubular film along a longitudinal axis, stabilizing means arranged exteriorly and interiorly of the film for preventing the oscillation of the film about the longitudinal axis over a predetermined distance by controlling the application of a gas stream over the exterior and interior surface of the film within the predetermined distance, and expanding means arranged adjacent the boundary of the predetermined distance for expanding the film thereat.

In accordance with another embodiment of the present invention, there is provided an apparatus for forming a film of plastic material. The apparatus is constructed of an extruder for supplying plastic material in a flowable state, a die arranged in advance of the extruder for forming a progressively advancing tubular film along a longitudinal axis, a primary air ring arranged adjacent the die and exteriorly of the film, the primary air ring supplying a first gas stream over the exterior surface of the film, a cylinder arranged interiorly of the film and extending along the longitudinal axis from the die, the cylinder and the interior surface of the film defining an annular region therebetween for receiving a second gas stream, controlling means for controlling the first and second gas streams to stabilize the film over a predetermined distance by preventing the oscillation of the film about the cylinder, and a secondary air ring arranged adjacent the boundary of the predetermined distance and exteriorly of the film, the secondary air ring supplying a third gas stream over the exterior surface of the film for expanding the film thereat.

In accordance with another embodiment of the present invention, there is provided a method for forming a film of plastic material. The method comprises the steps of forming a progressively advacing tubular film along a longitudinal axis, stabilizing the film over a predetermined distance by applying a gas stream over the interior and exterior surfaces of the film to prevent the oscillation of the film about the longitudinal axis, and expanding the film adjacent the boundary of the predetermined distance.

In accordance with another embodiment of the present invention, there is provided a method for forming a film of plastic material. The method comprises the steps of extruding a progressively advancing tubular film about a cylinder arranged along a longitudinal axis, applying a first gas stream over the exterior surface of the film, applying a second gas stream over the interior surface of the film within an annular region formed between the cylinder and the interior surface of the film, controlling the velocity and volume flow rate of the first and second gas streams over a predetermined distance to stabilize the film by preventing the oscillation of the film about the cylinder, and applying a third gas stream over the exterior surface of the film adjacent the boundary of the predetermined distance for expanding the film thereat.

BRIEF DESCRIPTION OF THE SOLE DRAWING

The above description, as well as further objects, features and advantages of the present invention will be more fully understood by reference to the following detailed description of a presently preferred, but nonetheless illustrative, high stalk blown film extrusion apparatus and method when taken in conjunction with the accompanying sole drawing. The sole drawing schematically illustrates the component parts of the extrusion apparatus of the present invention for the production of a blown film having a high stalk of greatly improved stability.

DETAILED DESCRIPTION

Referring now to the sole drawing, there is shown a high stalk blown film extrusion apparatus generally designated by reference numeral 100. The extrusion apparatus 100 includes an extruder 102 having a supply hopper 104 containing a polymer 106 to be blown into a thin film by the extrusion apparatus. The polymer 106 is heated to a molten state within the extruder 102 and forced under high pressure through an extrusion die 108. The extrusion die 108, being circular in shape, has an annular opening through which a tubular film 110 of polymer in a semi-molten state is progressively advanced. The initial thickness of the tubular film 110 is determined by the size of the annular opening of the extrusion die 108. A primary air ring 112 is arranged adjacent the extrusion die 108 and surrounding the exterior of the tubular film 110. The primary air ring 112 is of the type known as a single lip air ring which prevents the performance of expansion work on the tubular film. One such primary air ring is obtainable from Sano Design and Machine of Passaic, N.J. and designated as a Single Orifice Air Ring. The primary air ring 112 is connected to an air blower 114 via a conduit 116. Arranged between the air blower 114 and primary air ring 112 is a control valve 118 and a temperature control unit 120. The control valve 118 is adapted for controlling the velocity and volume flow rate of air from the air blower 114 to an opening 122 provided in the primary air ring 112. As illustrated, the opening 122 is constructed and arranged for discharging a continuous stream of air at uniform velocity and uniform rate in a direction parallel to the external surface of the tubular film 110.

A cylindrical mandrel 124 is positioned centrally overlying the extrusion die 108 and arranged along the longitudinal axis of the tubular film 110. The mandrel 124 is constructed to have a smooth uninterrupted exterior surface which defines an annular region 126 with the interior surface of the tubular film 110 in the range of 0.125–1.4 inches, preferably in the range of 0.125–0.5 inches, and in accordance with the preferred embodiment, less than one-quarter inch. A passageway 128 is provided internally of the mandrel 124 and communicates between the interior region 130 of the blown film 132 and a conduit 134 arranged underlying the extrusion die 108. The conduit 134 is connected to an exhaust blower 136 which communicates with the surrounding atmosphere. A control valve 138 is positioned in advance of the exhaust blower 136 to control the rate of withdrawal of air from the interior region 130 of the blown film 132. Optionally, a plurality of stabilizing guides 140 are positioned about the exterior of the mandrel 124 and extend into the annular region 126 to provide a restricted passageway 142. The guides 140 are arranged about the mandrel 124 at a location where the tubular film 110 has attained sufficient mechanical strength by its partial solidification to prevent damage thereto in the event of contact with the guides. To this end, the guides 140 are provided with a smooth uninterrupted exterior surface to prevent snagging of the tubular film 110. The guides 140 provide for increased stabilization of the tubular film 110 by locking the tubular film thereat in the manner to be described hereinafter.

Air is supplied over the interior surface of the tubular film 110 within the annular region 126 by a single annular nozzle 144 arranged within the annular region overlying the extrusion die 108. The nozzle 144 is arranged such that the discharged air flows in an upward direction parallel to the interior surface of the tubular film 110. An air blower 146 supplies air to the nozzle 144 through a conduit 148. A control valve 150 and temperature control unit 152 are provided within the conduit 148 between the air blower 146 and nozzle 144. The control valve 150 and temperature control unit 152 function in the same manner as the control valve 118 and temperature control unit 120 of the primary air ring 112. That is, the velocity and volume flow rate of air from the air blower 146 is controlled by the control valve 150, while the temperature of the air is controlled by the temperature control unit 152. As thus far described, the temperature, the velocity and volume flow rate of a stream of air flowing in a parallel direction over the interior and exterior surfaces of the tubular film 110 may be controlled.

A secondary air ring 154 is arranged spaced-apart in tandem with the primary air ring 112. The secondary air ring 154 is arranged a predetermined distance above the primary air ring 112 to define the extent of the tubular film 110 over which the tubular film is stabilized in accordance with the present invention. To this end, the secondary air ring 154 can be adjusted upwardly and downwardly by its support upon height adjustment member 156 as shown. The secondary air ring 154 is located adjacent the predetermined distance over which the tubular film 110 is stabilized to provide a location for film expansion. The secondary air ring 154 is of the dual lip type adapted to perform substantial expansion work upon the tubular film 110 to provide the blown film 132. One such secondary air ring 154 is manufactured by Sano Design and Machine and designated as a Super Cool Air Ring. The secondary air ring 154 is provided with a pair of spaced-apart openings 158, 160 for the discharge of air at a high velocity and high volume rate as to opening 158 and at a high velocity, low volume rate as to opening 160 to create a negative pressure adjacent the exterior surface of the tubular film 110 to perform the required expansion work. Air is supplied to the secondary air ring 154 by an air blower 162 connected to a conduit 164. A control valve 166 and temperature control unit 168 are arranged within the conduit 164 between the air blower 162 and secondary air ring 154. The control valve 166 controls the velocity and volume flow rate of air being discharged along the exterior surface of the tubular film 110 by the secondary air ring 154, while the temperature control unit 168 controls the temperature of the discharged air. It should thus far be understood that the primary air ring 112 is adapted for stabilizing the tubular film 110, while the secondary air ring 154 is adapted for expansion of the tubular film to provide the blown film 132. Although the primary air ring 112 performs a modest amount of controlled cooling of the tubular film 110, the primary cooling function is performed by the secondary air ring 154.

The extrusion apparatus 100 provides for the greatly increased stabilization of the tubular film 110 over a predetermined distance by the use of high velocity, low volume flow rate of air discharged over both the interior and exterior surfaces of the tubular film between the tandemly arranged primary air ring 112 and secondary air ring 154. The natural venturi vector forces keep the external air next to the exterior surface of the tubular film 110, while the mandrel 124 maintains the low volume flow rate of air within the annular region 126 at a sufficiently high velocity to keep the tubular film from oscillating about its longitudinal axis. The guides 140 prevent buffeting and actually make gentle contact with the solidified inside surface of the tubular film 110. The secondary air ring 154, being characterized as a high intensity cooling device, provides intensive cooling and expansion of the tubular film 110 at a location where desired, that is, providing the tubular film with a predetermined stalk height which is stabilized in accordance with the present invention. The velocity of air inside the high stalk, outside the high stalk and at the high intensity cooling and expansion area, i.e., the secondary air ring 154, are separately controlled to balance and stabilize the tubular film 110 and blown film 132.

In accordance with the method of the present invention, the extrusion apparatus 100 is adapted to manufacture blown film from a variety of low to high molecular weight polymers. For example, such polymers include high density polyethylene (HDPE), linear low density polyethylene (LLDPE), polypropylene, low density polyethylene (LDPE), polystyrene, PVC, polycarbonate, polysulfone, polyester, nylon, and the like. In producing films of such material, solid polymer is provided in the supply hopper 104 to be extruded in a molten state through the extrusion die 108 by the extruder 102. The thus formed tubular film 110 is stabilized over a predetermined height by the application of high velocity, low volume flow rate of air over the interior and exterior surfaces of the tubular film. In this regard, the primary air ring 112 applies such a stream of air over the exterior surface of the tubular film 110 at a control temperature by temperature control unit 120 and at a controlled rate by control valve 118.

Similarly, a stream of air is applied over the interior surface of the tubular film 110 by the annular nozzle 144 at a controlled temperature by temperature control unit 152 and at a controlled rate by control valve 150. The high velocity of the air stream over the interior and exterior surfaces of the tubular film stabilizes the film by preventing its oscillation about the mandrel 124 and about its longitudinal axis. The application of a low volume flow rate of air results in only modest cooling of the unexpanded tubular film thereby allowing for the control of the stalk height to a predetermined distance.

As a result of this created stalk height, the amount of machine direction drawdown of the tubular film 110 takes place at a greatly reduced rate over that of conventional tubular film extrusion processes. This permitted relaxation of the polymer stresses within the high stalk provides a uniformly stressed film for expansion having better uniformity of thickness and physical and mechanical properties. In addition, the high stalk height allows for randomization and interweaving of the long polymer molecules, rather than keeping them aligned parallel to the extrusion direction. This randomization and interweaving gives the blown film 132 greatly improved tensile and tear strength properties. In addition, by controlling the temperature of the air streams being applied over the exterior and interior surfaces of the tubular film 110, the film temperature over the high stalk may be maintained at an optimum temperature for ultimate blowing by the secondary air ring 154, and while being stabilized. This stabilization of the high stalk is further enhanced by the guides 140 which create the narrow passageways 142 to increase the velocity of air flowing in the annular region 126. This increased velocity of air has the tendency of locking the tubular film 100 about the guides 140, thereby increasing the stabilization of the tubular film over the predetermined distance of the thus created high stalk.

The size of the bubble of the blown film 132 is controlled primarily by the exhaust blower 136 and control valve 138. Generally, under steady state operation, the mass in of air via air blower 146 is equal to the mass of air being extracted from the interior region 130 by the exhaust blower 136 through the passageway 128 extending through the mandrel 124. In order to increase or decrease the size of the blown film 132, the internal pressure within the interior region 130 is momentarily increased or decreased, so as to affect the size of the blown film 132, which size is sensed by means of sonar sensors 170. Once the blown film 132 has achieved its predetermined size, the mass in and mass out of air within the interior region 130 is again balanced for steady state operation. The tubular film 110 is expanded and intensely cooled adjacent the frost line 172 in a conventional manner using the secondary air ring 154.

In accordance with the method of the present invention, the following Table I discloses the contemplated range for the various operating parameters in producing blown tubular film from the different disclosed polymers using the apparatus of the present invention. The operating parameters are based on the use of a 4 inch diameter extrusion die. In this regard, the mass flow, inside air flow, outside air flow and secondary air ring flow are directly proportional to the die diameter. Thus, for an 8 inch diameter extrusion die, the mass flow would be 200–1200 lb/hr, the inside air flow would be 40–1200 CFM, the outside air flow would be 40–1600 CFM and the secondary air ring flow would be 120–4000 CFM.

TABLE I

|  | UNITS | RANGE |
| --- | --- | --- |
| Resin Melt Index | gm/10 min. | .01–10 |
| Melt Temp. | °F. | 250–700 |
| Melt Pressure | Psi | 1,500–12,000 |
| Mass Flow | Lb/hr | 100–600 |
| Melt Tube Dia. | Inches | 3.2" to 6" |
| Melt Tube Thick | Mils | 20 to 200 |
| Inside Air Flow | CFM | 20–600 |
| Inside Air Velocity | FPM | 1,000–24,000 |
| Inside Air Temp. | °F. | (−20) to 300 |
| Outside Air Flow | CFM | 20–800 |
| Outside Air Velocity | FPM | 1,000–24,000 |
| Outside Air Temp. | °F. | (−20) to 300 |

TABLE I-continued

|  | UNITS | RANGE |
| --- | --- | --- |
| Sec. Air Ring Flow | CFM | 60-2,000 |
| Sec. Air Ring Velocity | FPM | 2,000-24,000 |
| Sec. Air Ring Temp. | °F. | (−20) to 150 |
| Blow Up Ratio | — | 0.8 to 9.0 |
| Film Thickness | Mils | 0.1 to 20 |
| Film Speed | FPM | 30 to 1,000 |
| Melt Tube Height/Die dia. | — | 1-20 |

By way of specific examples, it is contemplated that blown tubular film from LDPE, LLDPE and HDPE can be produced in accordance with the apparatus and method of the present invention under the following conditions as shown in Table II.

TABLE II

|  | UNITS | EXAMPLES | | |
| --- | --- | --- | --- | --- |
|  |  | I | II | III |
| Resin Type |  | LDPE | LLDPE | HDPE |
| Resin Melt Index | gm/10 min. | 2 | 2 | .05 |
| Melt Temp. | °F. | 360 | 440 | 430 |
| Melt Pressure | Psi | 3,500 | 4,500 | 6,000 |
| Mass Flow | Lb/hr | 375 | 300 | 415 |
| Melt Tube Dia. | Inches | 4" | 4" | 4" |
| Melt Tube Thick | Mils | 60 | 100 | 60 |
| Inside Air Flow | CFM | 160 | 140 | 180 |
| Inside Air Velocity | FPM | 8,000 | 7,000 | 9,000 |
| Inside Air Temp. | °F. | 45 | 45 | 45 |
| Outside Air Flow | CFM | 200 | 175 | 225 |
| Outside Air Velocity | FPM | 7,200 | 6,300 | 8,100 |
| Outside Air Temp. | °F. | 45 | 45 | 45 |
| Sec. Air Ring Flow | CFM | 700 | 630 | 770 |
| Sec. Air Ring Velocity | FPM | 10,000 | 9,000 | 11,000 |
| Sec. Air Ring Temp. | °F. | 45 | 45 | 45 |
| Blow Up Ratio | — | 2.5 | 2.5 | 4 |
| Film Thickness | Mils | 1.25 | 1.0 | 0.8 |
| Film Speed | FPM | 399 | 399 | 413 |
| Melt Tube Height/Die dia. | — | 8 | 8 | 8 |

As thus far described, the extrusion apparatus 100 and method of manufacturing blown tubular film in accordance with the present invention provides for increased bubble stability, improved gauge uniformity, reduced gauge standard deviation, improved optical properties, improved impact strength, improved tear strength, improved tensile strength, improved down gauging capability, and increased output.

Although the invention herein has been described with reference to particular embodiments, it is to be understood that the embodiments are merly illustrative of the principles and application of the present invention. For example, air from the interior region 130 of the blown film 132, which is supplied by air blower 146, could be recirculated through conduits 134, 148 thereby eliminating the exhaust blower 136 and control valve 138. It is therefore to be understood that numerous modifications may be made in the illustrative embodiments and that other arrangements may be devised without departing from the spirit and scope of the present invention as defined by the appended claims.

What is claimed is:

1. An apparatus for forming a film of plastic material, said apparatus comprising supplying means for supplying plastic material in a flowable state, a die arranged in advance of said supplying means for forming a progressively advancing unexpanded tubular film having a substantially uniform first diameter along a longitudinal axis over a predetermined distance, a primary air ring arranged adjacent said die and exteriorly of said film, said primary air ring supplying a first gas stream over the exterior surface of said film, means for supplying a second gas stream over the interior surface of said film, a cylinder arranged interiorly of said film and extending from said die along said longitudinal axis over said predetermined distance, said cylinder and the interior surface of said film defining an annular region therebetween for receiving said second gas stream, controlling means for controlling said first and second gas streams over said unexpanded tubular film to stabilize said film over said predetermined distance by preventing the oscillation of said film about said cylinder, and a secondary air ring arranged spaced from said primary air ring and exteriorly of said film having said first diameter, the distance between said primary and said secondary air rings defining said predetermined distance over which said film is stabilized, said secondary air ring supplying a third gas stream over the exterior surface of said film for stabilizing and expanding said film from said first diameter to a second diameter thereat.

2. The apparatus of claim 1 wherein said controlling means controls the velocity and volume flow rate of said first and second gas streams to prevent the oscillation of said film about said cylinder by controlling said first gas stream at a sufficiently high velocity, low volume flow rate over the exterior surface of said film over said predetermined distance and by controlling said second gas stream at a sufficiently high velocity, low volume flow rate over the interior surface of said film within said annular region and over said predetermined distance.

3. The apparatus of claim 1 further including means for controlling the temperature of said first and second gas streams.

4. The apparatus of claim 1 wherein said cylinder includes a passageway communicating between the interior of said film and the surrounding atmosphere.

5. The apparatus of claim 4 further including means for exhausting at a controlled rate at least a portion of said second gas stream from the interior of said film through said passageway.

6. The apparatus of claim 1 wherein the width of said annular region, in a radial direction, is in the range of 0.125 to 1.4 inches.

7. The apparatus of claim 1 wherein the exterior surface of said cylinder over said predetermined distance is substantially uninterrupted.

8. The apparatus of claim 7 further including guide means arranged about said cylinder within said predetermined distance and extending into said annular region for guiding said film thereover.

9. An apparatus for forming a film of plastic material, said apparatus comprising an extruder for supplying plastic material in a flowable state, a die arranged in advance of said extruder for forming a progressively advancing unexpanded tubular film having a substantially uniform first diameter along a longitudinal axis over a predetermined distance, a primary air ring arranged adjacent said die and exteriorly of said film, said primary air ring supplying a first gas stream over the exterior surface of said film, means for supplying a second gas stream over the interior surface of said film, a cylinder arranged interiorly of said film and extending from said die along said longitudinal axis over said predetermined distance, said cylinder and the interior surface of said film defining an annular region therebetween for receiving said second gas stream, controlling means for controlling said first and second gas streams over said unexpanded tubular film to stabilize said film over said predetermined distance, said controlling means controlling the velocity and volume flow rate of said first and second gas streams to prevent oscillation of said film about said cylinder by controlling said first gas stream at a sufficiently high velocity, low volume flow rate along the exterior surface of said film over said predetermined distance and by controlling said second gas stream at a sufficiently high velocity, low volume flow rate along the interior surface of said film within said annular region and over said predetermined distance, and a secondary air ring arranged spaced from said primary air ring and exteriorly of said film having said first diameter, the distance between said primary and said secondary air rings defining said predetermined distance over which said film is stabilized, said secondary air ring supplying a third gas stream over the exterior surface of said film for stabilizing and expanding said film from said first diameter to said second diameter thereat.

10. The apparatus of claim 9 wherein said controlling means controls said second gas stream through said annular region in a direction parallel to said interior surface of said film.

11. The apparatus of claim 9 further including means for controlling the temperature of said first, second and third gas streams.

12. The apparatus of claim 9 further including means for exhausting at a controlled rate at least a portion of said second gas stream from the interior of said film through a passageway provided in said cylinder.

13. The apparatus of claim 9 further including means for changing the distance between said primary and secondary air rings.

14. The apparatus of claim 9 wherein the width of said annular region, in a radial direction, is in the range of 0.125 to 1.4 inches.

15. The apparatus of claim 9 wherein the exterior surface of said cylinder over said predetermined distance is substantially uninterrupted.

16. The apparatus of claim 15 further including means arranged about the exterior of said cylinder within said predetermined distance and extending into said annular region for guiding said film thereover.

17. A method for forming a film of plastic material, said method comprising the steps of forming a progressively advancing unexpanded tubular film having a substantially uniform first diameter about a cylinder arranged along a longitudinal axis over a predetermined distance, applying a first gas stream over the exterior surface of said film, applying a second gas stream over the interior surface of said film within an annular region formed between said cylinder and the interior surface of said film, controlling the velocity and volume flow rate of said first and second gas stream over said unexpanded tubular film over said predetermined distance for stabilizing said film by preventing the oscillation of said film about said cylinder, and applying a third gas stream over the exterior surface of said film having said first diameter adjacent the extent of said predetermined distance for stabilizing and expanding said film from said first diameter to a second diameter thereat.

18. The method of claim 17 wherein said stabilizing includes applying within said predetermined distance said first gas stream at a sufficiently high velocity, low volume flow rate over the exterior surface of said film and said second gas stream at a sufficiently high velocity, low volume flow rate over the interior surface of said film to prevent the oscillation thereof.

19. The method of claim 18 wherein said first gas stream has a flow rate in the range of 5 to 200 CFM/inch of die diameter.

20. The method of claim 18 wherein said first gas stream has a velocity in the range of 1,000 to 24,000 FPM.

21. The method of claim 18 wherein said second gas stream has a flow rate in the range of from 5 to 150 CFM/inch of die diameter.

22. The method of claim 18 wherein said second gas stream has a velocity in the range of 1,000 to 24,000 FPM.

23. The method of claim 18 further including controlling the temperature of said first and second gas streams.

24. The method of claim 23 wherein said first and second gas streams have a temperature in the range of $-20°$ to $300°$ F.

25. The method of claim 17 further including exhausting at a controlled rate at least a portion of said second gas stream from the interior of said film through a passageway provided within said cylinder.

26. The method of claim 17 further including controlling the width of said annular region, in a radial direction, in the range of 0.125 to 1.4 inches.

27. The method of claim 17 further including controlling the width of said annular region, in a radial direction, in the range of 0.125 to 0.5 inches.

28. The method of claim 17 further including maintaining the width of said annular region, in a radial direction, less than about one-quarter inch.

29. The method of claim 17 wherein said stabilizing includes applying said gas stream over the interior surface of said film in a direction parallel thereto.

30. The method of claim 17 wherein said stabilizing includes applying said gas stream over the exterior surface of said film in a direction parallel thereto.

31. A method for forming a film of plastic material, said method comprising the steps of extruding a progressively advancing unexpanded tubular film having a substantially uniform first diameter about a cylinder arranged along a longitudinal axis over a predetermined distance, applying a first gas stream over the exterior surface of said film, applying a second gas stream over the interior surface of said film within an annular region formed between said cylinder and the interior surface of said film, controlling the velocity and volume flow rate of said first and second gas streams over said unexpanded tubular film over said predetermined distance for stabilizing said film, said stabilizing including applying said first gas stream at a sufficiently high velocity, low volume flow rate over the exterior surface of said film and said second gas stream at a sufficiently high velocity, low volume flow rate over the interior surface of said film to prevent the oscillation of said film about said cylinder, and applying a third gas stream over the exterior surface of said film having said first diameter adjacent the extent of said predetermined distance for stabilizing and expanding said film from said first diameter to a second diameter thereat.

32. The method of claim 31 wherein said first gas stream has a flow rate in the range of 5 to 200 CFM/inch of die diameter.

33. The method of claim 32 wherein said first gas stream has a velocity in the range of 1,000 to 24,000 FPM.

34. The method of claim 31 wherein said second gas stream has a flow rate in the range of from 5 to 150 CFM/inch of die diameter.

35. The method of claim 34 wherein said second gas stream has a velocity in the range of 1,000 to 24,000 FPM.

36. The method of claim 31 wherein said stabilizing includes exhausting at a controlled rate at least a portion of said second gas stream from the interior of said film through a passageway provided within said cylinder.

37. The method of claim 31 wherein said stabilizing includes controlling the width of said annular region, in a radial direction, in the range of 0.125 to 1.4 inches.

38. The method of claim 31 wherein said stabilizing includes controlling the width of said annular region, in a radial direction, in the range of 0.125 to 0.5 inches.

39. The method of claim 31 wherein said stabilizing includes controlling the width of said annular region, in a radial direction, less than about one-quarter inch.

40. The method of claim 31 wherein said stabilizing includes applying said second gas stream over the interior surface of said film in a direction parallel to said interior surface and within said annular region.

41. The method of claim 42 wherein said stabilizing includes applying said first gas stream over the exterior surface of said film in a direction parallel thereto.

42. The method of claim 31 further including controlling the temperature of said first, second and third gas streams.

43. The method of claim 42 wherein said first and second gas streams have a temperature in the range of −20° to 300° F. and said third gas stream has a temperature in the range of −20° to 150° F.

44. The method of claim 31 wherein said third gas stream has a velocity in the range of 2,000 to 24,000 FPM and a flow rate in the range of 5 to 500 CFM/inch of die diameter.

45. The method of claim 36 further including recirculating said at least said portion of said second gas stream into said annular region and over the interior surface of said film.

46. The method of claim 31 further including maintaining the diameter of said film substantially constant over said predetermined distance.

47. The method of claim 44 wherein said predetermined distance is in the range of 1 to 20 times the diameter of said film.

* * * * *

UNITED STATES PATENT AND TRADEMARK OFFICE
CERTIFICATE OF CORRECTION

PATENT NO. : 4,606,879

DATED : August 19, 1986

INVENTOR(S) : Frank D. Cerisano

It is certified that error appears in the above-identified patent and that said Letters Patent is hereby corrected as shown below:

Column 2, line 56, "advacing" to --advancing--.

In the Claims:

Claim 41, line 1, change "42" to --40--.

Claim 47, line 1, change "44" to --46--.

Signed and Sealed this

Twentieth Day of January, 1987

Attest:

DONALD J. QUIGG

Attesting Officer     Commissioner of Patents and Trademarks